Oct. 23, 1928.

B. W. KADEL 1,688,389

DRAFT GEAR

Filed Dec. 13, 1923   2 Sheets-Sheet 1

Inventor
Byers W. Kadel

Oct. 23, 1928.
B. W. KADEL
DRAFT GEAR
Filed Dec. 13, 1923    2 Sheets-Sheet 2
1,688,389
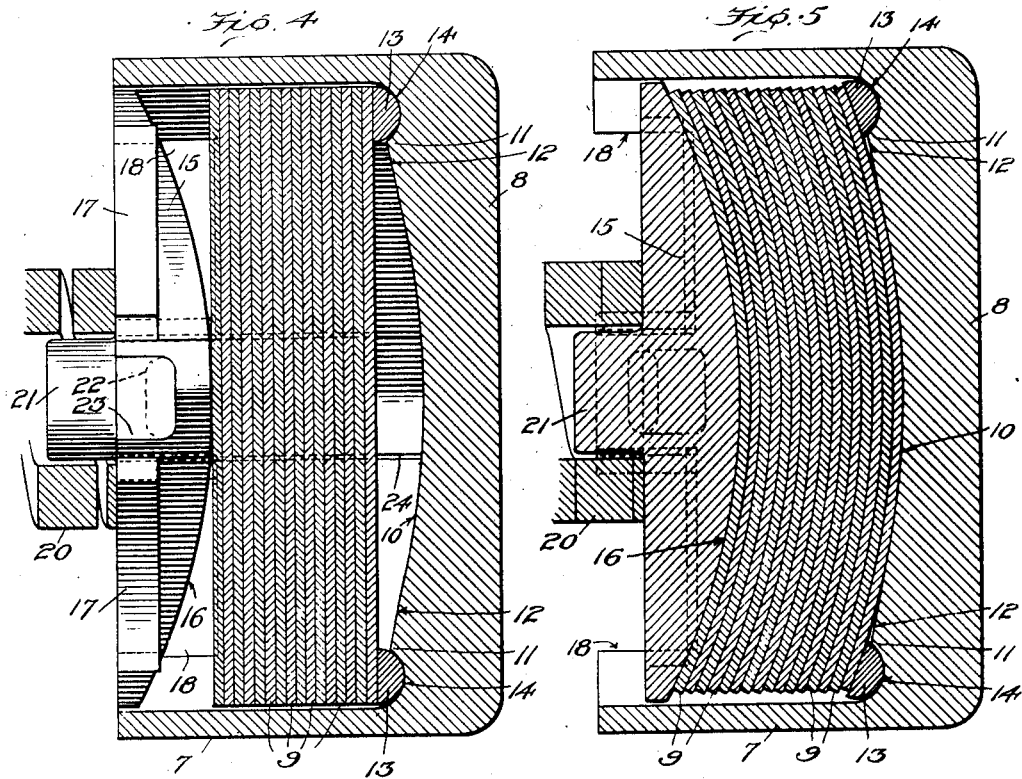
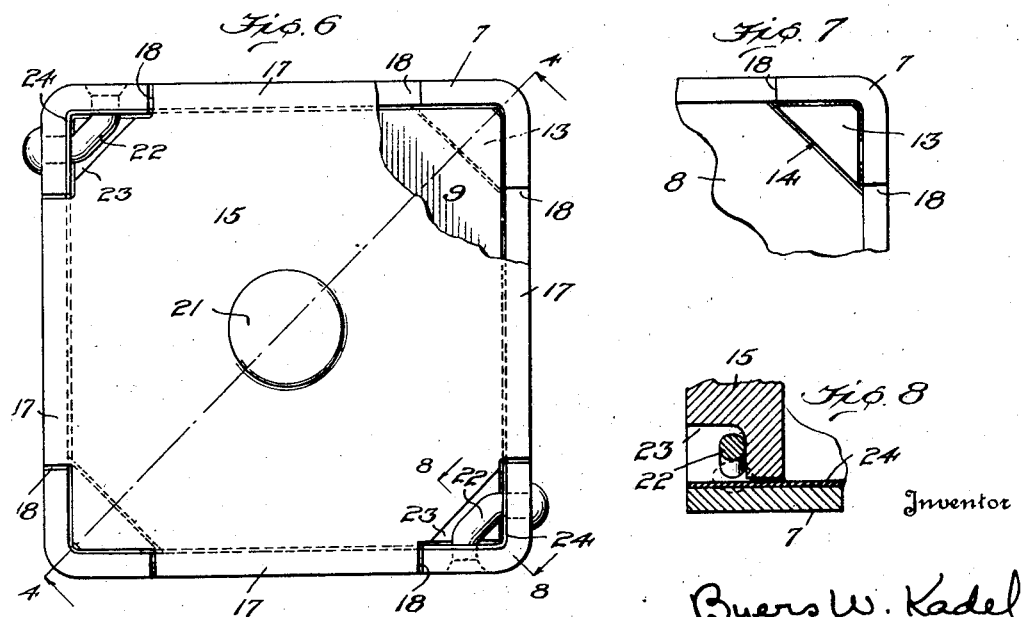
Inventor
Byers W. Kadel.

Patented Oct. 23, 1928.

1,688,389

UNITED STATES PATENT OFFICE.

BYERS W. KADEL, OF BALTIMORE, MARYLAND, ASSIGNOR TO THE SYMINGTON COMPANY, OF NEW YORK, N. Y., A CORPORATION OF MARYLAND.

DRAFT GEAR.

Application filed December 13, 1923. Serial No. 680,410.

The invention relates to shock absorbing mechanism adapted primarily for use in connection with railway draft rigging.

One of the principal objects of the invention, generally stated, is to provide a combined spring and friction draft gear of exceedingly high shock absorbing capacity which can be economically manufactured and in which maintenance costs are reduced to a minimum.

Another object of the invention, particularly stated, resides in the provision of a shock absorbing mechanism involving a plurality of friction plates and spring devices in which the buffing and draft loads are initially received by the spring device and subsequently transmitted to the friction members through the springs, one of which, after compression, goes solid and directly transfers the load to the friction plates, and the other, being of heavier capacity in addition to effectively resisting initial shocks, becomes sufficiently energized for quickly restoring the parts to normal position upon release.

Another object of the invention is to provide a combined spring and friction draft gear in which the friction portion of the mechanism includes a plurality of spring metal plates mounted within a casing or housing and capable of being deformed for developing an exceedingly large frictional resistance in which the resulting deflection curve substantially follows the arc of a circle as distinguished from the usual parabolic deflection curve obtained from spring plates as now supported in friction mechanisms of the class referred to, the result obtained from my present invention being an increased frictional resistance for the size and number of plates embodied in the draft gear.

A further object of the invention is to provide a draft gear of the class described including among other things, a housing for receiving the plates, said housing having a portion of its interior shaped to provide a concaved plate deflecting surface having its axis disposed diagonally of the housing and other portions of said interior forming diagonally arranged abutments, said plates being flexed between said abutments on diagonal lines extending across the plates and coinciding with the diagonal axis of the concaved deflecting surface, and a follower having a convex face adapted to engage the plates for flexing them between the diagonally disposed abutments and against the plate deflecting surface of the housing.

A still further object of the invention is to provide means for increasing the bearing surface for resisting the forces incident to the initial or preliminary loads, said means involving relatively small bearing members triangular in contour and arranged to receive the triangular corner portions of the innermost of the series of spring plates, each of said bearing members having a rounded face operable within a curved seat or pocket formed in the housing adjacent each diagonally arranged abutment portion adjoining the concaved spring deflecting surface.

A still further object of the invention is to provide a combined spring and friction shock absorbing device which can be readily installed as an associated unit in a railway draft rigging and in which the yoke member of the draft rigging may be effectively supported upon projections extending from the casing housing the friction elements.

The invention further consists in the combination, arrangement and construction of the several parts hereinafter described.

In the drawings illustrating the invention, the scope whereof is pointed out in the claims:

Figure 4 is a vertical longitudinal sectional view on the line 4—4 of Figure 6, with the parts in released position, the section being taken diagonally across the casing, spring friction plates and follower and at substantially right angles to the lines of flexure or axis of said spring plates.

Figure 5 is a view similar to Figure 4 with the several associated parts shown in position when resisting the loads transmitted to the gear.

Figure 6 is an end elevation of the casing and follower member viewed from the front end of the draft rigging, a portion of the follower being broken away to illustrate the spring metal friction plates contained within the casing.

Figure 7 is a detail face view of a portion of the casing illustrating the abutment portion and bearing member located therein.

Figure 8 is a detail section on the line 8—8 of Figure 6.

Figure 1:
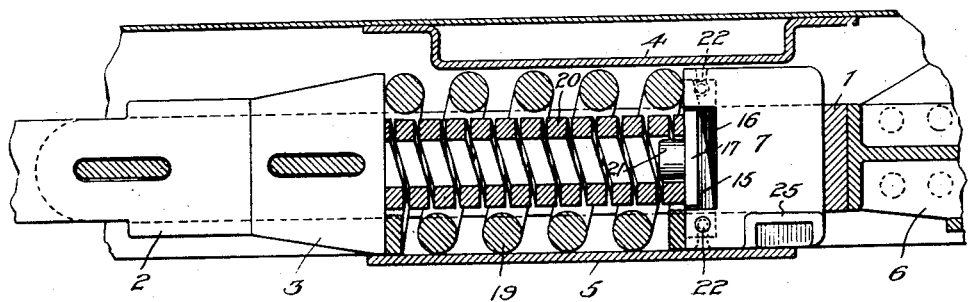
Figure 1 is a vertical longitudinal sectional view of my invention shown applied to a railway draft rigging of the Farlow type.
Figure 2:
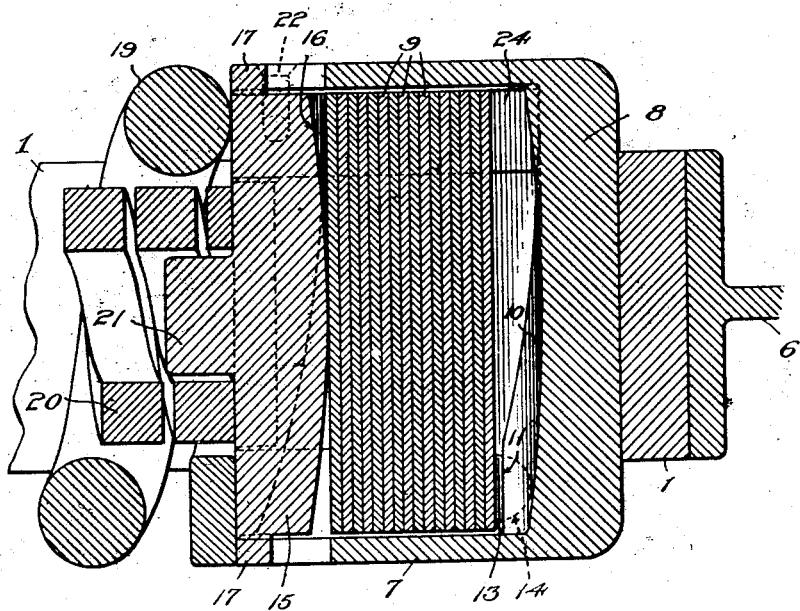
Figure 2 is a detail longitudinal sectional view of the shock absorbing unit illustrating the casing associated with a yoke and rear stop member, the spring plates, follower and actuating spring member being shown in normal or released position.
Figure 3:
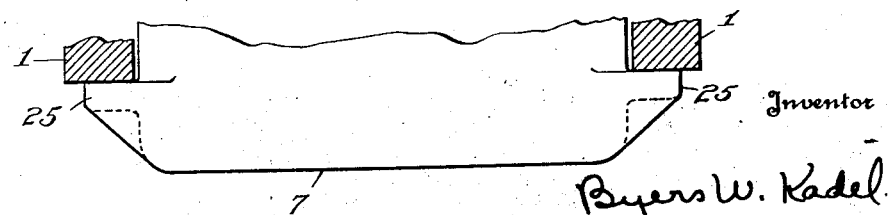
Figure 3 is a detail view of a portion of the rear end of the casing showing projections or lugs supporting the spaced arms of a horizontally disposed yoke member.

Referring to the drawings in which similar reference characters designate corresponding parts in the several views, there is shown a railway draft rigging comprising the usual car sills providing a draft rigging pocket in which latter is mounted a yoke member 1 having connected thereto the coupler 2. A key connected follower 3 embodying the Farlow construction is illustrated and the cushioning or shock absorbing mechanism is interposed between said follower and the rear end of the yoke. The cushioning mechanism is maintained in the draft rigging pocket in any suitable manner, plate members 4 and 5 providing top and bottom supporting and guiding means therefor, as shown in Figure 1. A back stop member 6 cooperates with the yoke and unites the center sills at the rear of the draft rigging pocket. While I have shown the shock absorbing mechanism associated with a Farlow two-key draft rigging it will be understood that the invention may be used with various other draft rigging constructions and I do not wish to limit myself to the disclosure herein.

The shock absorbing mechanism includes a casing 7 of approximately square shape, said casing having a closed end or bottom wall 8 and an open opposite end through which is inserted a plurality of spring metal plates 9 constituting the friction portion or element of the gear. The interior of the casing, and more particularly the end wall 8 thereof, is provided with a plate deflecting surface 10, said surface comprising a concaved portion, the axis of which is disposed diagonally of the bottom wall substantially from corner to corner thereof. The curve of the deflecting surface is practically that of an arc whereby the spring plates upon deformation are bent on a deflection curve following the arc.

Arranged near the outer edge portion of the deflecting surface are oppositely located abutment portions 11, said portions comprising the triangular corners lying between adjacent corner portions of the walls of the casing, as clearly shown in Figure 7. The abutment portions are diagonally arranged and provide the means which acts to resist the loads imposed upon the plates during their flexure. The concaved deflecting surface is preferably designed to terminate short of the abutment portions, thereby providing a convenient relief 12 for the corners of the spring metal plates adjacent the bearing members 13.

The bearing members 13 are preferably of triangular shape corresponding to the triangular abutment portions, said bearing members being substantially semi-circular in cross section and fitting within correspondingly curved recesses 14 formed in the abutment portions. The bearing members are adapted to receive the extreme triangular corner portions of the innermost of said spring metal plates and are relatively movable therewith when the plates are deformed. The preliminary loads imparted to the plates are received through these bearing members which move upon their seats and permit the plates to be subsequently flexed against the deflecting surface of the casing.

The spring metal plates 9 are approximately square and a sufficient number thereof corresponding to the capacity of the gear desired are positioned within the casing. The plates are positioned with respect to the draft rigging for flexure across the respective diagonal lines of the plates for obtaining increased deflection thereof and correspondingly greater frictional resistance. The plates are positioned with opposite diagonal corner portions thereof disposed in alinement with the spaced abutments 11 whereby the full loads imposed upon the gear flex the plates between said abutments and against the curved deflecting portion of the casing or housing. The plates are supported in the nature of beam members of uniform strength value thereby permitting the deflection curves of the respective plates to follow arcs of circles for relatively increasing the frictional resistance proportional to the size and number of plates used. It is to be understood, however, that reference to the plates as beam members of uniform strength value constitutes but one embodiment of the invention as the supporting abutments, together with the shape of the plates, their cross sectional area and the cooperating plate deflecting surface may be varied for establishing sufficient spring and frictional resistance in their deformation by the means now to be described.

The spring metal plates are flexed by means of the follower 15 having a convex face 16, the axis of the curve comprising the convexity extending diagonally of the follower and being disposed in a plane coincident with the diagonal axis of the plate deflecting surface 10. The follower is provided with projections 17 forming guide lugs adapted to be received in suitable cut-away portions 18 provided in the open end of the casing. The follower is adapted to cause the flexure of the spring plates through the operation of a plurality of springs interposed between the follower and a movable element of the draft rigging, shown herein as the follower block 3 contacting the butt end of the coupler.

The springs are of varying capacity, the outermost spring 19 having the coils thereof wound to a comparatively high stress for resisting the initial loads imparted to the gear, said spring serving to effect the release of the parts upon cessation of the loads. The inner spring 20 is preferably formed of metal, the cross sectional area of which is approximately square, the coils of said spring being wound to a comparatively low stress whereby upon application of the initial loads to the gear the spring is caused to go solid and provide a rigid member for imparting the succeeding loads through the follower member to the plates in the housing. It is desirable to provide springs of widely varying stress whereby the initial loads will be effectively resisted and the succeeding loads transmitted through a solid member, the spring forming said solid member being designed for repeated closure over an exceedingly long period of time without permanent injury. The outer spring 19 has its coil preferably wound to a pitch representing an abnormally high stress and the coils of the spring 20 are wound to an abnormally low stress, the latter of said springs closing to form a solid column which, in addition to transmitting the loads, also limits the travel of the spring 19 and protects it from overstressing. The arrangement of the outer and inner coil springs is such that a smaller amount of material may be employed in the outer coil spring and it can be relatively lengthened to fill up any pocket length for obtaining any desired travel. The outer spring may be supported in any suitable manner such, for example, as by the bottom plate 5 and a projection 21 extending from the follower 15 advantageously supports and hangs the inner spring 20 for permitting the closure of the several coils thereof in the formation of the solid member.

The spring metal plates and follower member 15 are preferably assembled in operable position in the casing 7, means being provided at the open end of the casing for retaining the parts in position. The means shown comprises rivets 22, said rivets passing through suitable openings in the adjacent walls of the casing and extending diagonally across the corner portions to provide limiting stops which prevent the withdrawal of the follower from the casing. The rivets are located in diagonally opposite corners of the open end of the casing and preferably extend through suitable cut-away portions 23 provided in the follower, as clearly shown in Figure 8. Suitable wear plates 24 are provided in the angular corner portions, said plates extending the length of the casing and being retained in position by the rivets 22, as best shown in Figure 6. The casing is preferably provided with projections 24, said projections being adapted to support the arms of the yoke 1 at the rear end thereof. It will also be observed that the casing 7 is supported upon the bottom member 5 acting to support the outer spring 19, said casing in the particular arrangement shown being located for engagement by the movable draft rigging member or yoke 1.

In operation the buffing loads are initially received by the outer spring 19, the continued movement of the coupler causing the inner spring 20 to close solidly whereupon the follower 15 operates to flex the spring-metal plates between the diagonally disposed abutments of the casing, the ultimate loads incident to the buffing operation causing the flexed plates to be moved solidly against the curved deflecting surface 10 of the casing which curved surface is designed to produce maximum deflection with correspondingly increased frictional resistance. On draft the loads are similarly initially resisted by the spring 19, the excess loads being imparted through the closing of the inner spring 20 and the flexing of the spring-metal plates by the following member.

A draft gear constructed in accordance with my present invention can be economically manufactured and easily positioned within the draft rigging pocket, it being observed that the several parts thereof are associated to provide for relatively long travel and high capacity with maximum durability over long periods of usage.

I claim:

1. A shock absorbing mechanism for railway draft rigging involving a housing having an interior portion concaved to form a spring deflecting surface, a plurality of spring plates mounted in said housing and adapted to be flexed respectively on lines extending diagonally across said plates, and means for transmitting the deforming forces to said plates, said means including a follower having a convex face adjacent the outermost of said plates, and springs engaging said follower, one of said springs being wound to relatively low stress to form a relatively solid member for directly transmitting the forces to the plates, and the other of said springs being wound to a high stress for taking the initial shocks and effecting the release of the gear.

2. A shock absorbing mechanism for railway draft rigging involving a plurality of spring plates constituting a friction element, a housing for said plates provided with spaced abutment portions against which diagonally opposite corner portions of the plates are resisted, and means operable against the intermediate portions, respectively, of the plates for flexing the same and gradually applying a distributed load between said abutment portions.

3. A shock absorbing mechanism for railway draft rigging having a plurality of spring plates constituting a frictional element, a housing for said plates having a curved deflecting surface, abutment portions diagonally disposed at opposite corner portions of said deflecting surface resisting the forces transmitted to the plates, and means including a follower member having a curved portion operable to flex, respectively, the portions of the plates lying between said abutments in curved planes corresponding to the curved deflecting portion of the housing.

4. A shock absorbing mechanism for draft rigging involving a plurality of spring plates constituting a friction element, a housing for said plates provided with diagonally disposed spaced abutment portions against which diagonally opposite corner portions, respectively, of the plates are resisted, and means adapted to flex and gradually apply a distributed load, respectively, to the portions of the plates lying between said abutments, said lines of flexure being disposed substantially at right angles to the lines diagonally extending across the abutment portions.

5. A shock absorbing mechanism for railway draft rigging involving a housing having an interior portion concaved to form a spring deflecting surface, a plurality of spring plates mounted in said housing, bearing members positioned in said housing and oppositely located adjacent the edge portions of said concaved deflecting surface, said bearing members being relatively movable with respect to the housing and contacting the innermost of said plates, and means for flexing respectively the intermediate portions of the plates between said bearing members, said bearing members being caused to move upon the initial flexure of the plates.

6. In a railway draft rigging, the combination with center sills, of a yoke member, a coupler connected to said yoke member, and a cushioning mechanism, said cushioning mechanism including a plurality of spring metal plates, means for supporting said plates for flexure across diagonally opposite corners thereof, and means for flexing said plates, said means comprising a plurality of springs, one of which acts to directly transmit the deforming forces to the plates and the other of which yieldingly resists said forces and becomes energized for effecting the release of said mechanism when the deforming forces are removed.

7. In a railway draft rigging, the combination with center sills, of a yoke member, a coupler connected to said yoke member, and a cushioning mechanism, said cushioning mechanism including a plurality of spring metal plates, means for supporting said plates for flexure between diagonally opposite corners thereof, means for flexing said plates, said means including a spring for resisting the initial forces imparted to the cushioning mechanism, and a member for positively and directly imparting said forces to the plates subsequent to initial resistance of said springs.

8. In a railway draft rigging, the combination with center sills, of a horizontal yoke, a coupler connected to said yoke, and a cushioning mechanism including a plurality of approximately square spring metal plates, means supporting said plates for flexure across lines diagonally connecting opposite corners of the plates, means for transmitting the deforming forces to effect the flexure of said plates, and means provided on the aforesaid plate supporting means for supporting the horizontal yoke.

9. In a railway draft rigging, the combination with center sills, of a yoke member, a coupler connected to said yoke member, a cushioning mechanism arranged between said yoke and coupler, and means connected to said center sills and supporting said cushioning mechanism, said means providing an approximately square draft rigging pocket, said cushioning mechanism involving a plurality of square metal plates supported in said pocket for flexure across lines diagonally connecting opposite corners of the plates, and means including follower portions with concave and convex surfaces engaging said plates for flexing said plates respectively on arcs of circles within said pocket for obtaining relatively increased frictional resistance with respect to the size of the plates.

10. In a railway draft rigging, the combination with center sills, of relatively movable draft rigging members including a coupler and yoke, and a cushion mechanism, said cushioning mechanism involving a plurality of spring-metal plates interposed between the coupler and yoke, and means for flexing said plates when resisting the loads imparted to the draft rigging, said means including a follower arranged adjacent one end of said plates, and a plurality of springs positioned between the follower and one of the movable draft rigging members, one of said springs being wound to a relatively low stress for solidly transmitting the excessive loads to the plates.

11. In a railway draft rigging, the combination with center sills, of relatively movable draft rigging members including a coupler and yoke, and a cushioning mechanism, said cushioning mechanism involving a plurality of spring metal plates interposed between the coupler and yoke, and means for flexing said plates when resisting the loads imparted to the draft rigging, said means including a follower arranged adjacent the plates, and a spring wound to relatively low stress and interposed between the follower and one of the movable draft rigging members, said spring being designed to close solidly for directly transmitting the loads to the plates.

12. In a railway draft rigging, the combination with center sills, of relatively movable draft rigging members including a coupler and yoke, and a shock absorbing device arranged between the center sills and the relatively movable draft rigging members, said device involving a plurality of spring plates, means supporting said plates for permitting their flexure under loads, and means operable between one of the relatively movable draft rigging members and the plurality of plates for transmitting the loads to the latter, said last named means including a spring having coils wound to an abnormally low spring stress for permitting the spring to close solidly when transmitting the loads.

13. In a railway draft rigging, the combination with center sills, of relatively movable draft rigging members including a coupler and yoke, and a shock absorbing device arranged between the center sills and the relatively movable draft rigging members, said device involving a plurality of spring plates, means supporting said plates for permitting their flexure under loads in one direction only, and means including a spring formed of approximately square cross-sectional material for transmitting the loads to the plates, said spring being arranged between one of the relatively movable draft rigging members and the plurality of spring plates and adapted to close solidly when flexing the latter.

14. In a railway draft rigging, the combination with center sills, of relatively movable draft rigging members including a coupler and yoke, and a shock absorbing device arranged between the center sills and the relatively movable draft rigging members, said device involving a plurality of spring plates, means supporting said plates for permitting their flexure under loads, and means for flexing the plates, said means including a spring formed of approximately square cross-sectional material wound to relatively low stress and adapted to provide a solid column between the plurality of spring plates and one of the relatively movable draft rigging members.

15. A shock absorbing device of the class described including in combination, a plurality of spring plates constituting a friction element, means supporting said plates for resisting the forces transmitted thereto, and a spring having its coils wound to an abnormally low spring stress, said spring being adapted to form a solid column for transmitting the loads to said plates.

16. A shock absorbing device for railway draft rigging including in combination, a plurality of spring plates constituting a friction element, means supporting said plates for resisting the loads imparted thereto, and means including a plurality of springs for flexing the plates, one of said springs having its coils wound to an abnormally high spring stress, and the other of said springs having its coils wound to an abnormally low spring stress, said last named spring providing a solid member for transmitting the loads flexing the plates and also acting to limit the travel of the first named spring.

17. A shock absorbing device of the class described including in combination, a plurality of spring plates constituting a friction element, means supporting said plates at opposite corners for resisting the loads transmitted thereto, and a spring formed of cross sectional material adapted to provide a solid column for transmitting the loads to said plates.

18. A shock absorbing device for railway draft rigging having a plurality of spring plates constituting a friction element, a housing for said plates having a concaved plate deflecting surface, oppositely disposed abutment portions located in relatively spaced relation from the outer edge portions of said deflecting surface for resisting the forces transmitted through the plates, and bearing means associated with said abutment portions for engaging the innermost of the plates, said bearing means forming continuations of the deflecting surface and acting to space the innermost of the plates from the casing between the outer edge portion of the deflecting surface and said abutments, and a follower adapted to engage the outermost of the plates for flexing the same between said abutments and against the deflecting surface.

19. A shock absorbing unit including a plurality of spring plates constituting a friction element, a housing for said plates having a portion of its interior curved to provide a plate deflecting surface, oppositely disposed plate abutment portions adjacent two opposite corners of the plates adapted to resist the forces transmitted through the plates, a follower having a curved face corresponding to the curved deflecting surface, said follower being adapted to flex the plates between said abutment portions, and means for retaining the follower and plates in assembled operable position within said housing.

20. A shock absorbing unit including a plurality of spring plates constituting a friction element, a housing for said plates having a portion of its interior curved to provide a plate deflecting surface, oppositely disposed plate abutment portions adapted to resist the forces transmitted through the plate, a follower having a curved face corresponding to the curved deflecting surface, said follower being adapted to flex the plates between said abutment portions, and means including members extending across adjacent walls of said housing at one end thereof for retaining the follower and plates in assembled operable position within the housing.

In testimony whereof, I affix my signature.

BYERS W. KADEL.